(12) United States Patent
Hill

(10) Patent No.: US 8,945,729 B1
(45) Date of Patent: Feb. 3, 2015

(54) THERMAL BARRIER COATING MATERIAL WITH RF ABSORPTION CAPABILITIES AT ELEVATED TEMPERATURES

(75) Inventor: Michael David Hill, Frederick, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 215 days.

(21) Appl. No.: 13/241,118

(22) Filed: Sep. 22, 2011

Related U.S. Application Data

(60) Provisional application No. 61/385,275, filed on Sep. 22, 2010.

(51) Int. Cl.
*C23C 4/10* (2006.01)
*C23C 4/08* (2006.01)

(52) U.S. Cl.
USPC .... 428/702; 428/701; 416/241 B; 416/241 R; 106/286.2

(58) Field of Classification Search
None
See application file for complete search history.

(56) References Cited

U.S. PATENT DOCUMENTS

| | | | | |
|---|---|---|---|---|
| 5,104,293 | A * | 4/1992 | Eaton et al. | 416/241 B |
| 6,434,876 | B1 * | 8/2002 | Wheat et al. | 427/203 |
| 7,148,166 | B2 * | 12/2006 | Teratani et al. | 501/98.4 |
| 7,507,268 | B2 * | 3/2009 | Rosenflanz | 51/309 |
| 2001/0027623 | A1 * | 10/2001 | Rosenflanz | 51/309 |
| 2002/0110709 | A1 * | 8/2002 | Katsuda et al. | 428/698 |
| 2002/0197155 | A1 * | 12/2002 | Howard et al. | 415/173.4 |
| 2003/0000151 | A1 * | 1/2003 | Rosenflanz et al. | 51/309 |
| 2003/0110708 | A1 * | 6/2003 | Rosenflanz | 51/307 |
| 2004/0096706 | A1 * | 5/2004 | Teratani et al. | 428/697 |
| 2005/0137078 | A1 * | 6/2005 | Anderson et al. | 501/127 |
| 2008/0277618 | A1 * | 11/2008 | Pracht et al. | 252/62 |
| 2010/0242797 | A1 * | 9/2010 | Nagano et al. | 106/286.2 |

* cited by examiner

*Primary Examiner* — Vera Katz
(74) *Attorney, Agent, or Firm* — Knobbe Martens Olson & Bear LLP

(57) ABSTRACT

Embodiments disclosed herein include compositions that serve, among other things, the dual function of a thermal barrier and an RF absorber. The compositions can be applied as a single layer to an aircraft engine component, thus reducing the weight of the aircraft and eliminating an extra coating step in the manufacturing process. The coating materials are designed to protect the metal underneath from the high temperatures generated during engine operation, and also to absorb or scatter radiation which may incumbent on the metal during operation. In some implementations, the compositions comprise a two phase mixture of perovskite and magnetoplumbite.

16 Claims, 2 Drawing Sheets

US 8,945,729 B1

THERMAL BARRIER COATING MATERIAL WITH RF ABSORPTION CAPABILITIES AT ELEVATED TEMPERATURES

CROSS-REFERENCE TO RELATED APPLICATIONS

This application claims the benefit of priority under 35 U.S.C. §119(e) of U.S. Provisional Application No. 61/385,275 filed on Sep. 22, 2010, which is incorporated herein by reference in its entirety.

BACKGROUND OF THE INVENTION

1. Field of the Invention

The present application generally relates to compositions for coating metallic components, and in particular, relates to thermal barrier coatings that can be used for aircraft engine components.

2. Description of the Related Art

Thermal barrier coatings are commonly applied to aircraft engine components and other metallic parts that operate at elevated temperature conditions. The coatings insulate the aircraft engine components from heat, thus allowing the components to operate under higher temperatures, which in turn can improve engine efficiency. Thermal barrier coatings also protect the engine components, such as turbine blades and combustion chambers, from oxidation and thermal fatigue that may be caused by prolonged thermal exposure. For example, yttria modified zirconia is commonly used as a thermal barrier coating because of the favorable heat insulating properties of zirconia. While a number of different thermal barrier coating materials have been developed for aircraft engine components, there is a continuing need for coatings that are stable at higher temperature conditions.

For military aircrafts, it may also be desirable to apply a radio frequency (RF) absorber material on the engine components to evade radar detection. A layer of RF absorber such as Ferrite 50 or TT2-111R, available from Trans-Tech Inc. of Adamstown, Md., is often applied to the turbine blades in addition to the thermal barrier coating. However, the additional layer adds weight to the aircraft and requires an additional manufacturing step. As such, there is a need to find an effective thermal barrier coating that can operate at higher temperature conditions and there is also a need for reducing the layers of coating on aircraft engine components.

SUMMARY

The compositions, materials, methods of preparation, devices, and systems of this disclosure each have several aspects, no single one of which is solely responsible for its desirable attributes. Without limiting the scope of this invention, its more prominent features will now be discussed briefly.

Any terms not directly defined herein shall be understood to have all of the meanings commonly associated with them as understood within the art. Certain terms are discussed below, or elsewhere in the specification, to provide additional guidance to the practitioner in describing the compositions, methods, systems, and the like of various embodiments, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents, unless it is explicitly stated. Use of examples in the specification, including examples of terms, is for illustrative purposes only and does not limit the scope and meaning of the embodiments herein.

In one aspect, embodiments disclosed herein include compositions that serve, among other things, the dual function of a thermal barrier and an RF absorber. The compositions can be applied as a single layer to an aircraft engine component, thus reducing the weight of the aircraft and eliminating an extra coating step in the manufacturing process. Coating materials comprising the compositions can be applied to metals, such as engine components. The coating materials are designed to protect the metal underneath from the high temperatures generated during engine operation, and also to absorb or scatter radiation which may incumbent on the metal during operation.

Some embodiments include a thermal barrier and RF absorber composition having magnetic activity, such as paramagnetic, ferromagnetic, or ferromagnetic, at temperatures in the range of about 800° C.-1,000° C. The composition may have strain tolerance when applied as a coating on a metallic turbine blade. The composition may have a thermal expansion coefficient of about $10 \times 10^{-6}/°$ C. or above. In some embodiments, the thermal expansion coefficient of the material may match or be similar to that of the metal of the aircraft engine turbine blades to which it may be applied. The material may melt congruently so that it may be plasma sprayed in the molten phase and cooled to form the desired phase assemblages. The material may have a thermal conductivity similar to or less than that of yttria stabilized zirconia.

In various embodiments, the dual function thermal barrier coating material generally comprises a Lanthanides (Ln)—Aluminum (Al)—Iron (Fe)—Oxygen (O) system. In one embodiment, the thermal barrier coating material comprises a composition that is represented by the formula $LnAl_{1-x-y}Fe_xM_yO_3$ or the formula $LnAl_{11(1-x-y)}Fe_xM_yO_{18}$, where $0 \leq x < 1$ and $0 \leq y < 0.5$. In one implementation, Ln can be Lathanum (La), Praseodymium (Pr), Neodymium (Nd), Samarium (Sm), or a combination thereof; M can be Cobalt (Co), Nickel (Ni), or Copper (Cu), or a combination thereof. In another embodiment, the dual function thermal barrier coating material may comprise a two-phased composite of $LnAl_{1-x-y}Fe_xMO_3$ and $LnAl_{11(1-x-y)}Fe_xM_yO_{18}$.

In another aspect, embodiments disclosed herein include metal substrates that incorporate the dual function thermal barrier of certain preferred embodiments. In some embodiments, the metal substrates can be part of an aircraft engine component such as the turbine blades.

DETAILED DESCRIPTION OF THE PREFERRED EMBODIMENT

Figure 1:
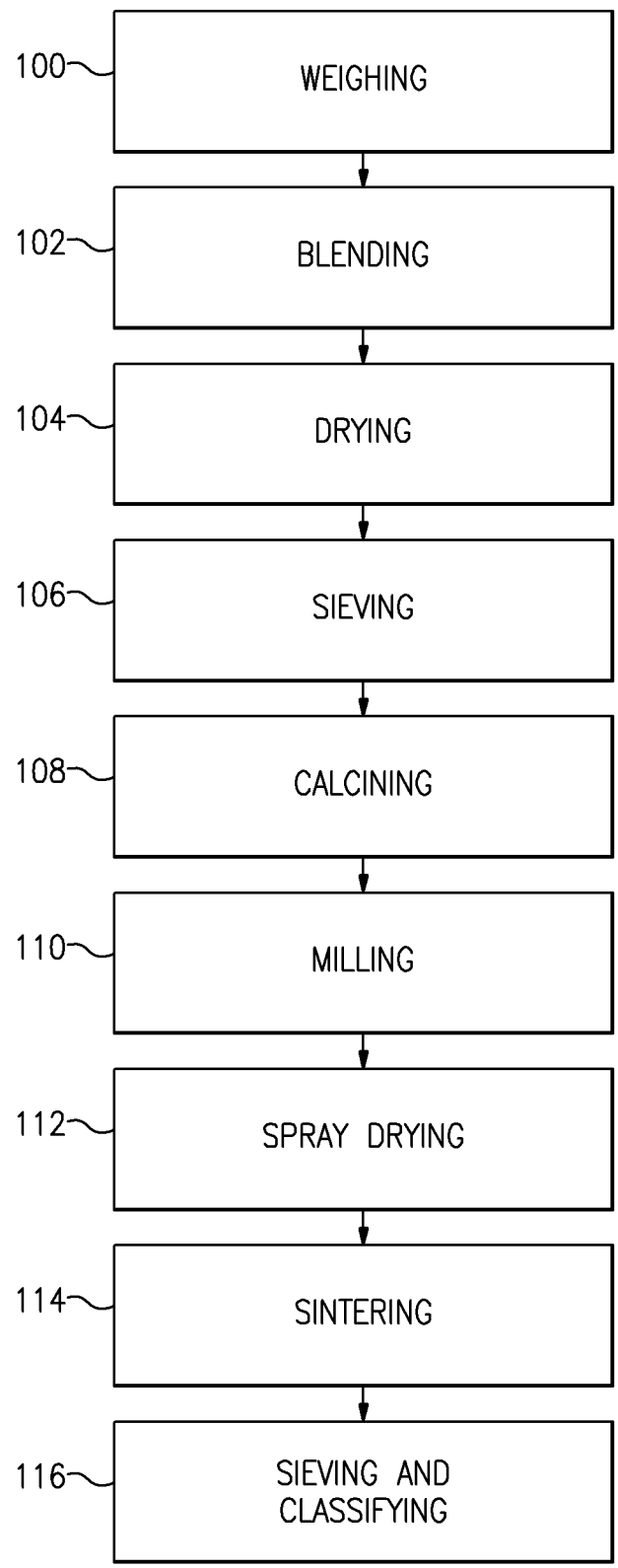
FIG. 1 illustrates an aircraft component incorporating the thermal barrier coating with RF absorbing capabilities in according to one embodiment of the present invention.

Aircraft engine components, such as turbine blades and combustion chambers, are typically coated with a layer of thermal barrier coating. The thermal barrier coating serves to prevent the metallic components from heating past its melting point during engine operation. A coating such as yttria modified zirconia can be applied to the turbine blades as a thermal barrier. In addition to the thermal barrier layer, another coating having RF absorbing capabilities is also typically applied to the engine component to prevent radar detection.

Disclosed herein are coating compositions that have both thermal barrier and RF absorbing properties such that a single layer of the coating composition would be sufficient for protecting aircraft engine components or other metallic parts that operate under high temperature conditions and that may require RF absorption or scattering.

Dual Function Coating Composition

Preferred embodiments of the dual function coating composition generally comprise one or more crystalline structures of the Lanthanide-Aluminum-Iron-Oxygen (Ln—Al—Fe—O) system. The crystalline structures may include, for example, perovskites and magnetoplumbites. These crystalline structures are preferably compatible with one another and may be used individually or may be combined as a two phase mixture. The crystalline structures are preferably selected for their ability to preserve the paramagnetic behavior at high temperatures, which makes them good high temperature RF absorbers. For example, in the perovskite structure, both Fe and Co show octahedral co-ordination and may show multiple oxidation states, each with an unfilled 3$d$ electron shell which enhances the magnetic properties. Cobalt, in particular, may show a variety of different oxidation states (+2, +3, and +4) each with a high spin, a medium spin, and a low spin state.

The variety of spin states and oxidation states may cause magnetic interactions well above the ferromagnetic Curie temperature in these crystalline structures. Additionally, in some embodiments, the magnetoplumbite structure has crystallographic sites available which show diverse co-ordination spheres. Hexahedral, tetrahedral, and octahedral sits are available for Fe and Co in some embodiments of the magnetoplumbite structure, which leads to a variety of magnetic interactions.

In one embodiment, the coating composition may be represented by the formula $LnAl_{1-x-y}Fe_xM_yO_3$ or $LnAl_{11(1-x-y)}Fe_xM_yO_{18}$, where $0<x<1$ and $0<y<0.5$. In one implementation, Ln can be Lathanum (La), Praseodymium (Pr), Neodymium (Nd), Samarium (Sm), or a combination thereof; M can be Cobalt (Co), Nickel (Ni), or Copper (Cu), or a combination thereof. In one implementation, the dual function coating material may comprise a two-phased composite of $LnAl_{1-x-y}Fe_xM_yO_3$ and $LnAl_{11(1-x-y)}Fe_xM_yO_{18}$. Although the parent aluminate structures $LnAlO_3$ and $LnAl_{11}O_{18}$ have been used as thermal barrier coating materials, the two-phased composite of $LnAl_{1-x-y}Fe_xM_yO_3$ and $LnAl_{11(1-x-y)}Fe_xM_yO_{18}$ surprisingly shows exceptional strain tolerance. It is believed that the magnetoplumbite would form needle like crystals that can bridge cracked columns of the perovskite phase, which increases strain tolerance of the material, Another advantage to the two-phased composite of $LnAl_{1-x-y}Fe_xM_yO_3$ and $LnAl_{11(1-x-y)}Fe_xM_yO_{18}$ is that it improves compatibility with the thermally grown aluminum oxide on bonded nickel based superalloys which are used in some aircraft engine components.

Furthermore, La, Pr, Nd and Sm are selected to be included in embodiments of the above crystalline structures because each does not form an aluminate garnet ($Ln_3Al_5O_{12}$) which is intermediate in alumina content between the perovskite and the magnetoplumbite phases and decomposes by undesirable peritectic melting. The $LnAlO_3$ and $LnAl_{11}O_{18}$ phases each show congruent melting both individually and in a two phase assemblage which is desirable for plasma spraying.

Preferred embodiments of the dual function coating compositions advantageously provide both thermal barrier and RF absorber properties. Some embodiments of the coating composition have magnetic activity, such as paramagnetic, ferromagnetic, or ferromagnetic, at temperatures in the range of about 800° C.-1,000° C. The compositions may have strain tolerance when applied as a coating on a metallic turbine blade. The composition may have a thermal expansion coefficient of about $10 \times 10^{-6}/°$ C. or above. In some embodiments, the thermal expansion coefficient of the material may match or be similar to that of the metal of the aircraft engine turbine blades to which it may be applied. The material may melt congruently so that it may be plasma sprayed in the molten phase and cooled to form the desired phase assemblages. The material may have a thermal conductivity similar to or less than that of yttria stabilized zirconia.

Preparation of the Modified Synthetic Garnet Compositions

The preparation of the dual function coating composition can be accomplished by using known ceramic techniques. A particular example of the process flow is illustrated in FIG. 1.

As shown in FIG. 1, the process begins with step 100 for weighing the raw material. The raw material may include oxides and carbonates such as Iron Oxide ($Fe_2O_3$), Lanthanum Oxide ($La_2O_3$), Aluminum Oxide ($Al_2O_3$), Cobalt Oxide ($CoO_x$) or combinations thereof. In addition, organic based materials may be used in a sol gel process for ethoxides or and acrylate or citrate based technique may be employed. Co-precipitation of hydroxides may also be employed as a method to obtain these materials by one skilled in the art. In addition, a glycine nitrate or spray pyrolysis technique may be used for blending and simultaneously reacting the materials.

After the raw material is weighed, they are blended in Step 102 using methods consistent with the current state of the ceramic art, which can include aqueous blending using a mixing propeller, or aqueous blending using a vibratory mill with steel or zirconia media.

The blended oxide is subsequently dried in Step 104, which can be accomplished by pouring the slurry into a pane and drying in an oven, preferably between 100-400° C. or by spray drying, or by other techniques known in the art.

The dried oxide blend is processed through a sieve in Step 106, which homogenizes the powder and breaks up soft agglomerates that may lead to dense particles after calcining.

The material is subsequently processed through a pre-sintering calcining in Step 108. Preferably, the material is loaded into a container such as an alumina or cordierite sagger and heat treated in the range of about 1100-1300° C., preferably below the solidus temperature indicated on the relevant phase diagram.

After calcining, the material is milled in Step 110, preferably in a vibratory mill, an attrition mill, a jet mill or other standard comminution technique to reduce the median particle size into the range of about 0.5 micron to 10 microns. Milling is preferably done in a water based slurry but may also be done in ethyl alcohol or another organic based solvent. In addition, dry milling techniques such as a jet mill may be used as well. Milling may be done by any technique available to those skilled in the state of the art in ceramic processing.

The material is subsequently spray dried in Step 112. During the spray drying process, organic additives such as binders and plasticizers can be added to the slurry using techniques known in the art. The material is spray dried to provide granules amenable to pressing, preferably in the range of about 10 microns to 150 microns in size.

The spray dried granules are subsequently pressed in Step 114, preferably by uniaxial or isostatic pressing to achieve a pressed density to as close to 60% of the x-ray theoretical density as possible. In addition, other known methods such as tape casting, tape calendaring or extrusion may be employed as well to form the unfired body. Other heat treatment techniques such as induction heating may also be employed by one skilled in the art. After sintering, the bars will be crushed into a powder using a jaw crusher or muller or a similar technique known to those skilled in the art.

The pressed material may be heated on a setter plate in a periodic kiln or a tunnel kiln in air or pressure oxygen in the range of 1100° C.-1400° C. to obtain a dense ceramic compact. Other known treatment techniques such as induction heat may also be used in this step.

The dense ceramic compact is sieved can classified in Step 116 in which the powder will be sort into the appropriate particle size range using a air classifier or a similar instrument known to those skilled in the art.

Components Incorporating the Dual Function Coating Compositions

The dual function coating compositions made in accordance with the preferred embodiments in this disclosure can be utilized on various metallic parts that are subject to high temperature conditions and require some form of RF absorption or scattering.

Figure 2:
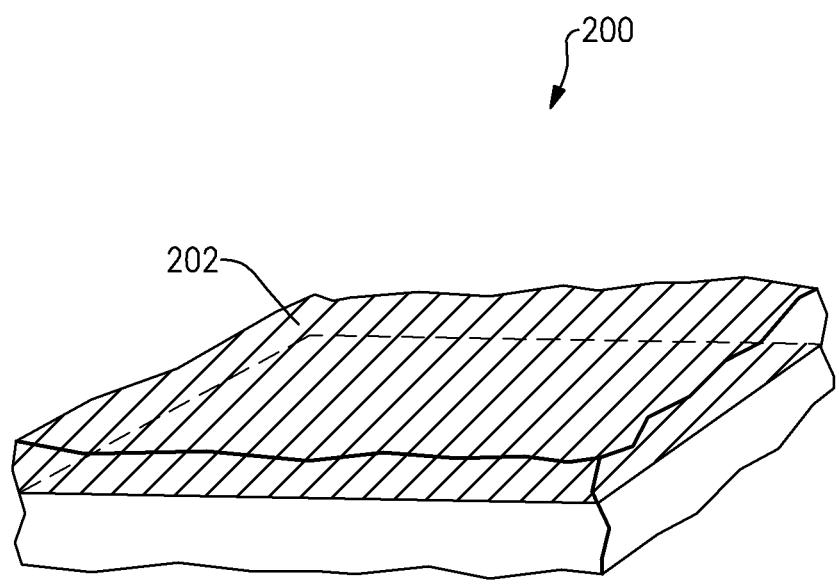
FIG. 2 is a flow chart illustrated a method of manufacturing a thermal barrier coating material with RF absorbing capabilities according to one embodiment of the present invention.

FIG. 2 schematically shows a substrate 200 incorporating a layer of the dual function coating composition 202. The substrate 200 can be part of a military aircraft engine component such as the turbine blades. Advantageously, the single layer of dual function coating composition 202 not only serves as a thermal barrier for the substrate 200 but also absorbs and/or scatters RF, which in turn reduces the overall weight of the engine component. It will be appreciated that in various embodiments, the coating compositions can also serve other functions in addition to the dual functions described herein.

While certain embodiments of the inventions have been described, these embodiments have been presented by way of example only, and are not intended to limit the scope of the disclosure. Indeed, the novel compositions, methods and systems described herein may be embodied in a variety of other forms; furthermore, various omissions, substitutions and changes in the form of the compositions, methods and systems described herein may be made without departing from the spirit of the disclosure. The accompanying claims and their equivalents are intended to cover such forms or modifications as would fall within the scope and spirit of the disclosure.

What is claimed is:

1. A coating composition comprising a two phase mixture of $LnAl_{11(1-x-y)}Fe_xM_yO_{18}$ and $LnAl_{1-x-y}Fe_xM_yO_3$, x and y both being greater than 0, x being less than 1, and y being less than or equal to 0.5, the coating composition providing the dual function of a thermal barrier and an RF absorber, Ln being selected from the group consisting of La, Pr, Nd, Sm, and combinations thereof, and M being selected from the group consisting of Co, Ni, Cu, and combinations thereof.

2. An aircraft component incorporating the composition of claim 1.

3. The composition of claim 2 wherein the coating composition has a thermal expansion matching the aircraft component.

4. An engine turbine blade incorporating the coating composition of claim 1.

5. The composition of claim 1 wherein the coating composition has magnetic activity in the temperature range of about 800° C.-1000° C.

6. The composition of claim 5 wherein the magnetic activity is paramagnetic or ferromagnetic activity.

7. The composition of claim 1 wherein the coating composition has a thermal expansion coefficient of about $10 \times 10^{-6}/°$C. or greater.

8. The composition of claim 1 wherein the coating composition is configured to melt congruently.

9. The composition of claim 1 wherein the coating composition has a thermal conductivity equal to or less than that of yttria stabilized zirconia.

10. The composition of claim 1 wherein the coating composition further comprises perovskites or magnetoplumbites, or combinations thereof.

11. The composition of claim 1 wherein the coating composition is compatible with thermally grown aluminum oxide on bonded nickel based superalloys.

12. The composition of claim 1 wherein the coating composition does not include an $Ln_3Al_5O_{12}$ aluminate garnet.

13. The composition of claim 1 wherein the coating composition is configured to be used in plasma spraying.

14. The composition of claim 1 wherein the coating composition further comprises Fe and Co having octahedral co-ordination.

15. The composition of claim 1 wherein the coating composition does not decompose through peritectic melting.

16. The composition of claim 1 wherein the coating composition scatters RF.

* * * * *